(12) United States Patent
Mori et al.

(10) Patent No.: US 10,888,923 B2
(45) Date of Patent: Jan. 12, 2021

(54) MANUFACTURING MACHINE

(71) Applicant: DMG MORI CO., LTD., Yamatokoriyama (JP)

(72) Inventors: Masahiko Mori, Yamatokoriyama (JP); Yuhei Mezawa, Yamatokoriyama (JP); Shigeyuki Takashima, Yamatokoriyama (JP); Shigetsugu Sakai, Yamatokoriyama (JP); Makoto Fujishima, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 111 days.

(21) Appl. No.: 15/559,278

(22) PCT Filed: Mar. 7, 2016

(86) PCT No.: PCT/JP2016/056950
§ 371 (c)(1),
(2) Date: Sep. 18, 2017

(87) PCT Pub. No.: WO2016/152477
PCT Pub. Date: Sep. 29, 2016

(65) Prior Publication Data
US 2018/0093325 A1    Apr. 5, 2018

(30) Foreign Application Priority Data
Mar. 20, 2015    (JP) ................................ 2015-057194

(51) Int. Cl.
*B22F 3/105*    (2006.01)
*B23Q 15/007*    (2006.01)
(Continued)

(52) U.S. Cl.
CPC ............ *B22F 3/105* (2013.01); *B22F 3/1055* (2013.01); *B22F 3/16* (2013.01); *B22F 3/24* (2013.01);
(Continued)

(58) Field of Classification Search
CPC .......... B22F 3/105; B22F 3/1055; B22F 3/24; B22F 3/16; B23K 15/0086;
(Continued)

(56) References Cited

U.S. PATENT DOCUMENTS 7,020,539 B1 *   3/2006   Kovacevic ............ B22F 3/1055
                                                                  700/166
9,724,877 B2 *   8/2017   Flitsch .................... E01C 23/07
(Continued)

FOREIGN PATENT DOCUMENTS

CN    103862296 A    6/2014
CN    104384936 A    3/2015
(Continued)

OTHER PUBLICATIONS

International Search Report dated Apr. 26, 2016 in PCT/JP2016/056950, filed Mar. 7, 2016.

*Primary Examiner* — Jessee R Roe
*Assistant Examiner* — Michael Aboagye
(74) *Attorney, Agent, or Firm* — Oblon, McClelland, Maier & Neustadt, L.L.P.

(57) ABSTRACT

A manufacturing machine is capable of additive manufacturing. The manufacturing machine includes: a connecting part configured to be connectable to a machine tool capable of subtractive manufacturing; and an additive manufacturing head configured to be positioned in a machining area of the machine tool and discharge a material, when the connecting
(Continued)

part is connected to the machine tool. The manufacturing machine for additive manufacturing that can be installed at a low cost is thus provided.

8 Claims, 7 Drawing Sheets

(51) Int. Cl.
*B28B 1/32* (2006.01)
*B22F 3/16* (2006.01)
*B23P 23/04* (2006.01)
*B29C 67/00* (2017.01)
*B33Y 30/00* (2015.01)
*B23K 26/21* (2014.01)
*B23Q 15/00* (2006.01)
*B29C 64/106* (2017.01)
*B22F 3/24* (2006.01)
*B23K 26/00* (2014.01)
*B23K 15/00* (2006.01)
*B23K 26/342* (2014.01)
*C04B 35/64* (2006.01)
*B23K 26/34* (2014.01)
*C22C 1/04* (2006.01)
*B33Y 40/00* (2020.01)

(52) U.S. Cl.
CPC ...... *B23K 15/0086* (2013.01); *B23K 26/0093* (2013.01); *B23K 26/21* (2015.10); *B23K 26/34* (2013.01); *B23K 26/342* (2015.10); *B23P 23/04* (2013.01); *B23Q 15/00* (2013.01); *B23Q 15/007* (2013.01); *B28B 1/32* (2013.01); *B29C 64/106* (2017.08); *B29C 67/00* (2013.01); *B33Y 30/00* (2014.12); *C04B 35/64* (2013.01); *B22F 2003/1056* (2013.01); *B22F 2999/00* (2013.01); *B33Y 40/00* (2014.12); *C04B 2235/6026* (2013.01); *C04B 2235/665* (2013.01); *C22C 1/0408* (2013.01); *Y02P 10/25* (2015.11)

(58) Field of Classification Search
CPC .... B23K 26/0093; B23K 26/21; B23K 26/34; B23K 26/342; B23P 23/04; B23Q 15/00; B23Q 15/007; B28B 1/32; B29C 67/00; B29C 64/106; B33Y 30/00; C04B 35/64
USPC ....... 266/137; 427/554, 596; 219/64, 63, 66, 219/84, 121.47, 121.63, 121.66, 121.84, 219/121.85, 121.6, 121.75, 121.76
See application file for complete search history.

(56) References Cited

U.S. PATENT DOCUMENTS

2011/0282482 A1* 11/2011 Knighton ............... B33Y 30/00 700/111
2014/0374933 A1 12/2014 Flitsch et al.
2015/0183070 A1* 7/2015 Jones ..................... B23P 23/04 219/76.14

FOREIGN PATENT DOCUMENTS

| CN | 104619460 A | 5/2015 | |
| JP | 2004-314168 A | 11/2004 | |
| JP | 2012-206137 A | 10/2012 | |
| WO | WO2014013247 | * 1/2014 | ............. B22F 3/105 |

* cited by examiner

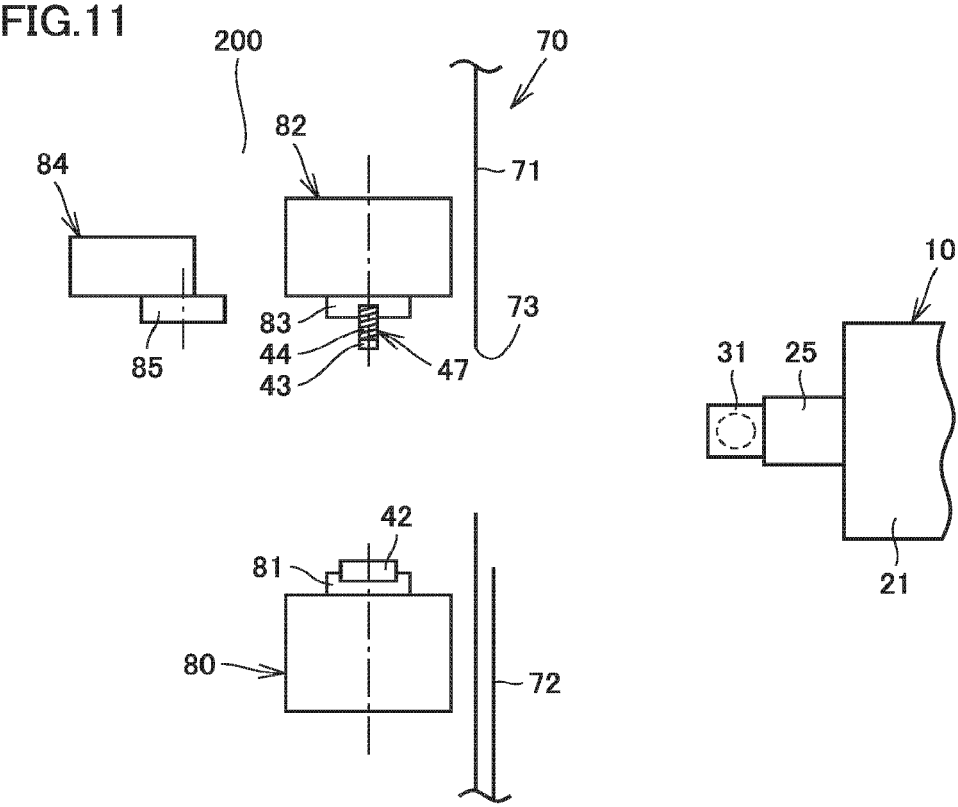

MANUFACTURING MACHINE

TECHNICAL FIELD

The present invention generally relates to manufacturing machines, and more specifically relates to a manufacturing machine capable of additive manufacturing.

BACKGROUND ART

Regarding conventional manufacturing machines, Japanese Patent Laying-Open No. 2004-314168 for example discloses a laser cladding apparatus for pump devices with the purpose of fast and accurate cladding without causing cracks in a base material (Patent Document 1). The laser cladding apparatus disclosed in Patent Document 1 includes a powder feeder feeding a metal material (powder) by means of argon gas as a carrier gas, a vortex-type powder feed nozzle uniformly mixing the fed metal material with the argon gas and simultaneously using a gas mixture of argon and nitrogen as a shield gas, and a multi-axis robot moving the vortex-type power feed nozzle.

Japanese Patent Laying-Open No. 2012-206137 discloses a repair apparatus with the purpose of easily performing cladding welding without human labor (Patent Document 2). The repair apparatus disclosed in Patent Document 2 includes a material feeding unit, a laser apparatus emitting a laser spot beam, and a welding robot having a multi-joint arm for moving the laser spot beam in three-dimensional directions.

CITATION LIST

Patent Document

PTD 1: Japanese Patent Laying-Open No. 2004-314168
PTD 2: Japanese Patent Laying-Open No. 2012-206137

SUMMARY OF INVENTION

Technical Problem

Additive manufacturing is a process of creating a three-dimensional shape by depositing materials onto a workpiece. In contrast, subtractive manufacturing is a process of creating a three-dimensional shape from a workpiece by removing materials from the workpiece. The mass of the workpiece has been increased after additive manufacturing, while the mass of the workpiece has been decreased after subtractive manufacturing.

When a workpiece is processed, one of additive manufacturing and subtractive manufacturing is selected appropriately in consideration of respective characteristics of additive manufacturing and subtractive manufacturing. If, however, a complete manufacturing machine to be used for additive manufacturing is installed separately from a machine tool to be used for subtractive manufacturing, a high installation cost is required.

An object of the present invention is therefore to solve the above problem and provide a manufacturing machine that is used for additive manufacturing and can be installed at a low cost.

Solution to Problem

A manufacturing machine according to an aspect of the present invention is a manufacturing machine capable of additive manufacturing. The manufacturing machine includes: a connecting part configured to be connectable to a machine tool capable of subtractive manufacturing; and an additive manufacturing head configured to be positioned in a machining area of the machine tool and discharge a material, when the connecting part is connected to the machine tool.

A manufacturing machine according to another aspect of the present invention is a manufacturing machine capable of a first additive manufacturing. The manufacturing machine includes: a connecting part configured to be connectable to an additive manufacturing machine capable of a second additive manufacturing different in type from the first additive manufacturing; an additive manufacturing head configured to be positioned in a machining area of the additive manufacturing machine and perform the first additive manufacturing by discharging material powder and emitting a laser beam to a workpiece, when the connecting part is connected to the additive manufacturing machine; a material powder feeder configured to feed material powder to the additive manufacturing head; and a laser oscillator configured to generate a laser beam to be emitted to a workpiece.

Advantageous Effects of Invention

According to the present invention, a manufacturing machine that is used for additive manufacturing and that can be installed at a low cost can be provided.

BRIEF DESCRIPTION OF DRAWINGS

FIG. 11 is a diagram schematically showing a sixth step of the processing method for the workpiece in FIG. 5.

DESCRIPTION OF EMBODIMENTS

Figure 1:
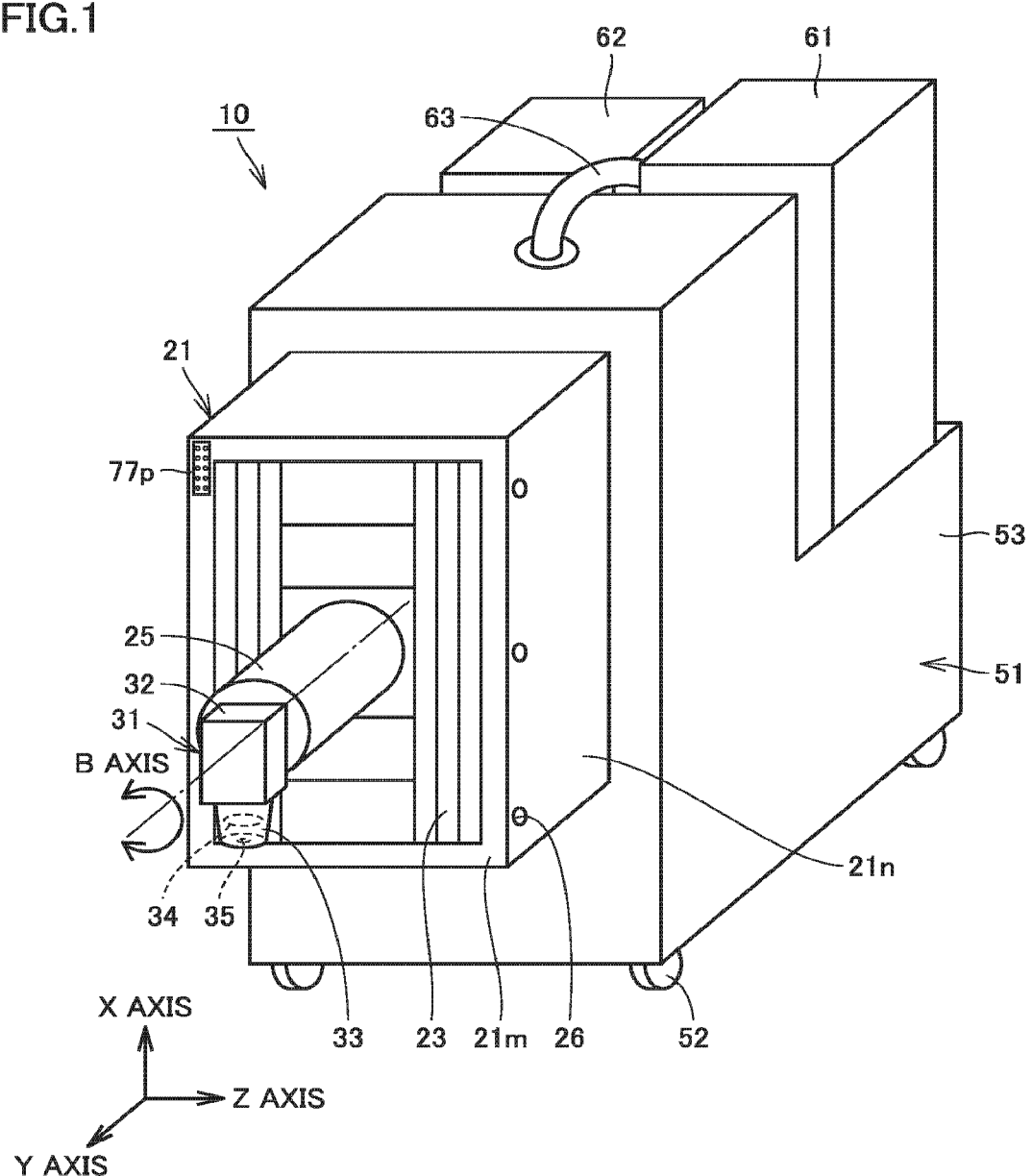
FIG. 1 is a perspective view showing a manufacturing machine used for additive manufacturing in a first embodiment of the present invention.

Embodiments of the present invention will be described with reference to the drawings. In the drawings referenced below, the same or corresponding members are denoted by the same numerals.

First Embodiment

Figure 2:
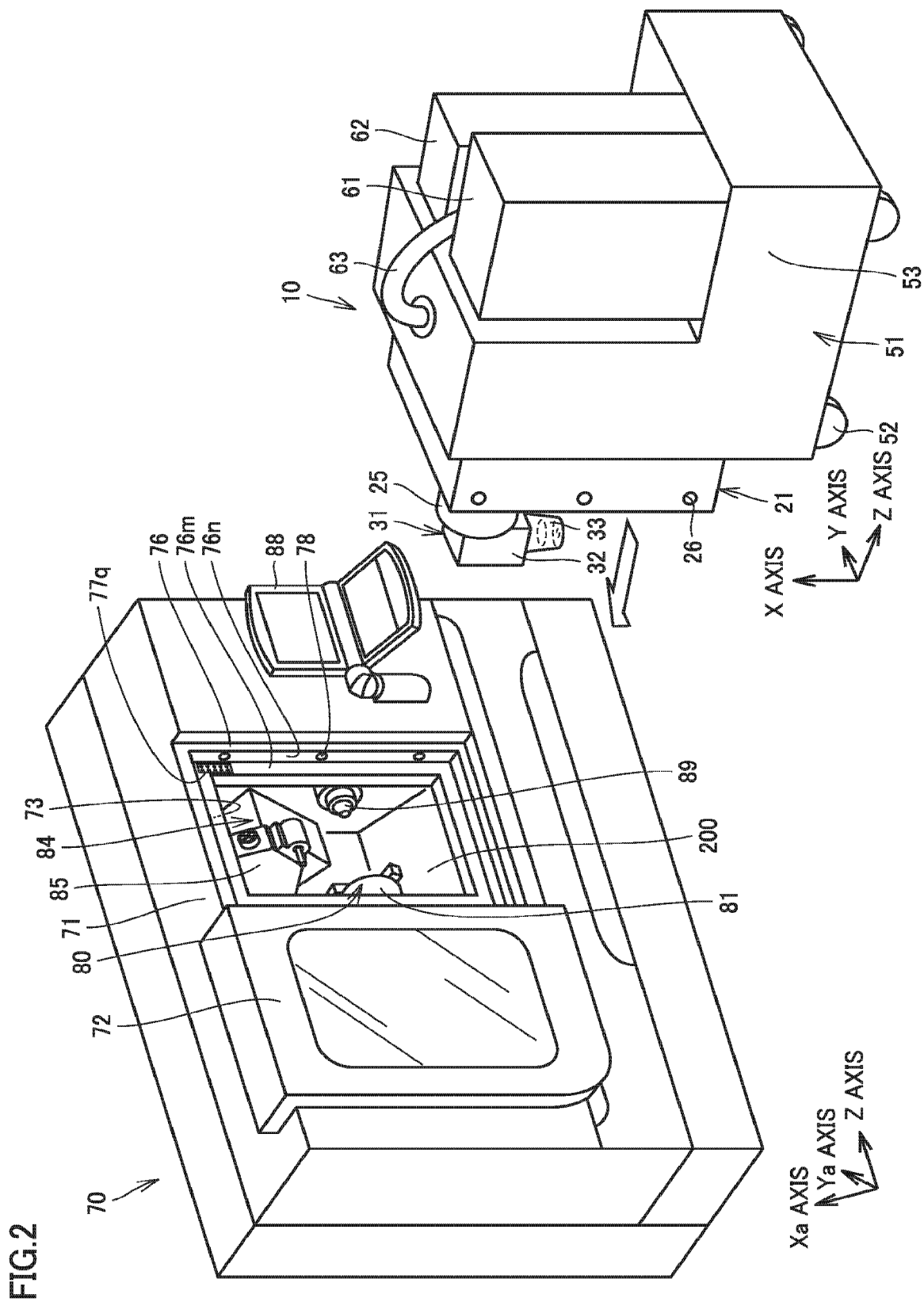
FIG. 2 is a perspective view showing the manufacturing machine in FIG. 1 and a machine tool used for subtractive manufacturing to which the manufacturing machine in FIG. 1 is to be connected.

FIG. 1 is a perspective view showing a manufacturing machine used for additive manufacturing in a first embodiment of the present invention. FIG. 2 is a perspective view showing the manufacturing machine in FIG. 1 and a machine tool used for subtractive manufacturing to which the manufacturing machine in FIG. 1 is to be connected.

Referring to FIGS. 1 and 2, a machine tool 70 performs subtractive manufacturing (SM) on a workpiece. A manufacturing machine 10 in the present embodiment is connected to machine tool 70 to perform additive manufacturing (AM) on a workpiece.

First, the overall structure of manufacturing machine 10 is described. Manufacturing machine 10 includes an additive manufacturing head 31 and a head drive mechanism (not shown). Additive-manufacturing head 31 performs additive manufacturing by discharging material powder toward a workpiece and emitting a laser beam toward the workpiece (directed energy deposition). The head drive mechanism is made up of any of various feed mechanisms and guide mechanisms, a servo motor, and the like.

Additive manufacturing head 31 is configured to be movable, by the head drive mechanism, in the direction of an X axis extending vertically, the direction of a Y axis orthogonal to the X axis and extending horizontally, and the direction of a Z axis orthogonal to the X axis and the Y axis and extending horizontally. Additive manufacturing head 31 is further configured to be swivelable about a central axis extending in parallel with the Y axis (swiveling about B axis). In this way, the position where additive manufacturing is performed by additive manufacturing head 31 can be moved three-dimensionally and the direction in which the laser beam is emitted toward a workpiece can be changed.

The structure of additive manufacturing head 31 is more specifically described. Additive manufacturing head 31 includes a main body 32 and a laser beam emission part 33.

Main body 32 is attached to the leading end of a head-supporting cylinder 25 described later herein in such a manner that allows main body 32 to swivel about the B axis. Material powder supplied from a material powder feeder 61 described later herein is introduced into main body 32 and a laser beam generated by a laser oscillator 62 described later herein is introduced into main body 32. Main body 32 contains elements such as collimation lens and reflection mirror, and the laser beam introduced into main body 32 is directed toward laser beam emission part 33.

In laser beam emission part 33, an opening 35 is formed. The laser beam and the material powder are emitted through opening 35. Opening 35 is formed at a position spaced radially from the swivel axis (B axis) of additive manufacturing head 31. Laser beam emission part 33 contains an optical element 34. Optical element 34 is an element (such as condenser lens and mirror) for concentrating the laser beam onto a workpiece and defining a laser-beam-irradiated region on the workpiece. Opening 35 has an opening shape that allows the laser beam directed from optical element 34 toward the workpiece to pass through.

Laser beam emission part 33 may be configured to be detachably mounted on main body 32. In this case, a plurality of laser beam emission parts 33 containing respective optical elements 34 that are different in type from one another can be prepared to mount, on main body 32, a laser beam emission part 33 suitable for additive manufacturing to be performed. Depending on the type of optical element 34, the shape of the laser-beam-irradiated region on the workpiece varies (circular region or rectangular region, for example) and/or the size thereof varies (φ2 mm or φ4 mm, for example).

Figure 3:
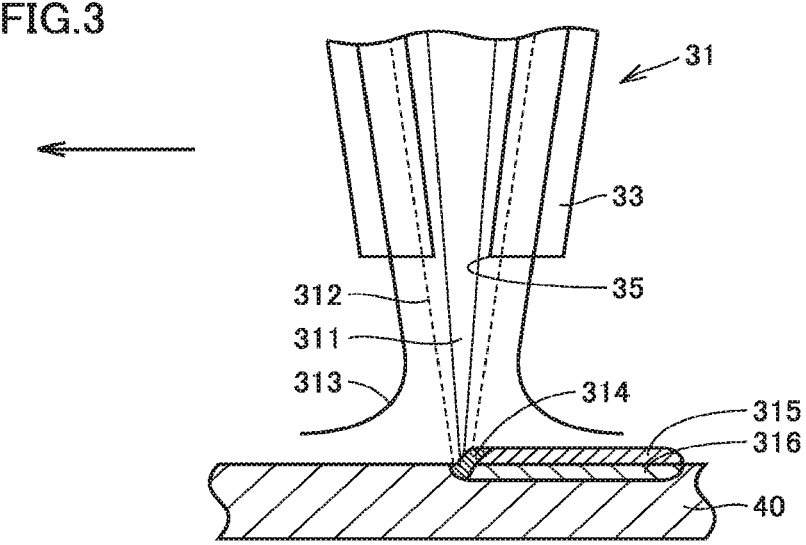
FIG. 3 is a cross-sectional view showing, in an enlarged form, a surface of a workpiece subjected to additive manufacturing.

FIG. 3 is a cross-sectional view showing, in an enlarged form, a surface of a workpiece subjected to additive manufacturing. Referring to FIG. 3, while the head drive mechanism (not shown) keeps the aperture of opening 35 facing the surface of workpiece 40, the head drive mechanism causes additive manufacturing head 31 to scan across a workpiece 40. At this time, a laser beam 311, material powder 312, and shield-and-carrier gas 313 are discharged from opening 35 of additive manufacturing head 31 toward workpiece 40. Accordingly, a melt spot 314 is formed in the surface of workpiece 40 and consequently material powder 312 is melted and deposited.

Specifically, a cladding layer 316 is formed in the surface of workpiece 40. On cladding layer 316, a cladding material 315 is deposited. Cladding material 315 is cooled into a machinable layer formed on the surface of workpiece 40.

Instead of laser beam 311, an electron beam may be used. As the material powder, metal powder of aluminum alloy, magnesium alloy, or the like, or ceramic powder may be used.

Referring to FIGS. 1 and 2, manufacturing machine 10 further includes a connecting part 21, a head-supporting cylinder 25, and a front cover 23.

Connecting part 21 is configured to be connectable to machine tool 70. As seen in the direction of the Y axis, connecting part 21 has a shape (rectangular shape in the present embodiment) corresponding to the shape of the aperture of an opening 73 formed in machine tool 70. The connecting structure of connecting part 21 to be connected to machine tool 70 is detailed later herein.

Connecting part 21 is substantially in the shape of a rectangular parallelepiped as a whole. Connecting part 21 has a front part 21*m* facing in the direction of the Y axis and lateral parts 21*n* extending in the direction crossing front part 21*m*. Front part 21*m* has a strip-shaped edge and an opening inside the strip-shaped edge. Front cover 23 is configured to close the opening of front part 21*m*.

Head-supporting cylinder 25 extends in the shape of a cylinder (circular cylinder) from front cover 23 in the Y-axis direction, and additive manufacturing head 31 is mounted on the leading end of head-supporting cylinder 25. Additive manufacturing head 31 is connected through head-supporting cylinder 25 to the head drive mechanism (not shown). Front cover 23 is a panel-type telescopic cover to allow additive manufacturing head 31 (head-supporting cylinder 25) to move in the X-axis direction and the Z-axis direction.

Manufacturing machine 10 includes a dolly 51. Dolly 51 includes a plurality of wheels 52 and is configured to be movable. Additive manufacturing head 31 and connecting part 21 are mounted on dolly 51.

Manufacturing machine 10 further includes a material powder feeder 61, a laser oscillator 62, and a tubular member 63. Material powder feeder 61 includes a material powder tank for storing material powder to be used for additive manufacturing and a mixing unit for mixing the material powder with carrier gas, and configured to feed the material powder toward additive manufacturing head 31. Laser oscillator 62 generates a laser beam to be used for additive manufacturing. Tubular member 63 houses an optical fiber for directing the laser beam from laser oscillator 62 toward additive manufacturing head 31, and a pipe for directing the material powder supplied from material powder feeder 61 toward additive manufacturing head 31.

Material powder feeder 61 and laser oscillator 62 are mounted on dolly 51. Thus, manufacturing machine 10 is movable in the form of an additive manufacturing unit into which material powder feeder 61 and laser oscillator 62 are integrated.

Manufacturing machine 10 further includes an inert gas feeder (not shown) and an environmental measurement device (not shown). The inert gas feeder is provided as a source of an inert gas (shield-and-carrier gas 313 in FIG. 3) discharged toward a workpiece during additive manufacturing. Preferably, the inert gas feeder is mounted on dolly 51.

The environmental measurement device measures the environment in a machining area of machine tool 70. An example of such an environmental measurement device may be oxygen concentration sensor, humidity sensor, or temperature sensor. Preferably, these sensors are attached to additive manufacturing head 31.

When titanium (Ti) or aluminum (Al) is used as the material powder and additive manufacturing is performed in an oxygen atmosphere, air bubbles may remain in a workpiece due to oxidization of the material, and particularly when fine powder is used as the material powder, sudden oxidization may hinder execution of additive manufacturing. In order to avoid these outcomes, the oxygen concentration sensor measures the oxygen concentration in the machining area of machine tool 70. The material powder of aluminum reacts with moisture to generate heat. The humidity sensor measures the humidity in the machining area of machine tool 70 in order to prevent such generation of heat from the material powder. The temperature sensor is provided for measuring the temperature of a portion heated by being irradiated with the laser beam. As the temperature sensor, a radiation thermometer is used, for example.

Additive manufacturing to be performed by manufacturing machine 10 is not limited to the aforementioned directed energy deposition, and may for example be material extrusion by which a molten thermoplastic resin is deposited on a workpiece to produce a three-dimensional shape, or powder bed fusion by which heat is applied to selectively fuse and harden the powder bed around a surface of the powder bed and thereby form a layer.

The overall structure of machine tool 70 to which manufacturing machine 10 is to be connected is described next. Machine tool 70 is a lathe rotating a workpiece and machining the workpiece by causing a tool to contact the workpiece.

Machine tool 70 includes a bed (not shown), a headstock 80, a tailstock 89, and a tool rest 84.

The bed is a base part supporting other parts mentioned above, and mounted on an installation surface in a factory or the like. The bed is made from a material such as cast iron.

Headstock 80 and tailstock 89 are attached to the bed. Headstock 80 and tailstock 89 are disposed to face each other in the Z-axis direction. Headstock 80 includes a spindle 81 for rotating a workpiece. Spindle 81 is configured to be rotatable about a central axis extending in parallel with the Z axis. Spindle 81 is equipped with a chuck mechanism for detachably holding a workpiece. Tailstock 89 has a function of supporting an end of a long workpiece mounted on headstock 80.

Tool rest 84 is supported above the bed by means of a saddle or the like (not shown). Tool rest 84 is configured to be movable in the direction of an Xa axis, the direction of a Ya axis, and the direction of the Z axis by any of various feed mechanisms and guide mechanisms, a servo motor, and the like mounted on the saddle or the like. The Xa axis is orthogonal to the Z axis and extends in the direction forming 45 degrees with respect to the horizontal direction. The Ya axis is orthogonal to the Xa axis and the Z axis and extends in the direction forming 45 degrees with respect to the horizontal direction.

To tool rest 84, a plurality of stationary tools for turning are attached. Tool rest 84 has a so-called turret shape, and a plurality of stationary tools are attached radially to tool rest 84, and tool rest 84 is provided for swivel indexing.

More specifically, tool rest 84 includes a swivel unit 85. Swivel unit 85 is provided to be swivelable about a central axis extending in parallel with the Z axis. At positions located at intervals in the direction of the circumference centered at the central axis, tool holders for holding stationary tools are attached. Swivel unit 85 swivels to thereby circumferentially move the stationary tools held by the tool holders, and a stationary tool to be used for turning is indexed.

Machine tool 70 further includes a splashguard 71. Splashguard 71 is provided to define the machining area for workpieces and serve as a cover body presenting the appearance of machine tool 70.

Splashguard 71 includes a door 72 and a receiving part 76. Door 72 is a part of the cover body defining the machining area for workpieces and configured to be openable and closable. In the present embodiment, door 72 is provided as a slidable door that is movable in the Z-axis direction. Door 72 is closed to close the machining area, and door 72 is opened to form opening 73 allowing access to the inside of the machining area from the outside. In the present embodiment, opening 73 is opened in the Y-axis direction. Opening 73 has a rectangular aperture.

Receiving part 76 has a frame shape forming the aperture of opening 73. Receiving part 76 is a part to which connecting part 21 of manufacturing machine 10 is connected. Receiving part 76 has a front part 76m and lateral parts 76n. Around the aperture of opening 73, front part 76m and lateral parts 76n form a recess shape for receiving connecting part 21 of manufacturing machine 10.

Machine tool 70 further includes an operation panel 88. Operation panel 88 includes various buttons and switches used for manipulating machine tool 70 as well as a display showing the state of machining in machine tool 70, for example. In the present embodiment, operation panel 88 also serves as an operation panel for manufacturing machine 10. Specifically, during additive manufacturing, a control signal generated in response to an operation performed on operation panel 88 is transmitted through an electrical connector 77p and an electrical connector 77q described later herein to manufacturing machine 10 to activate additive manufacturing head 31.

Figure 4:
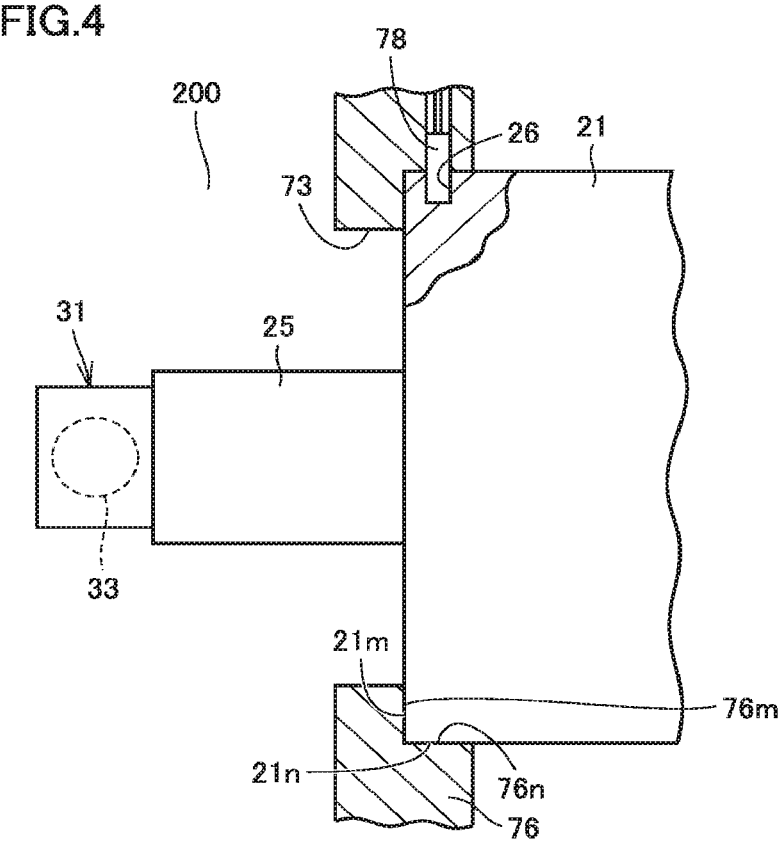
FIG. 4 is a cross-sectional view showing a connecting structure of a connecting part of the manufacturing machine connected to the machine tool in FIG. 2.

FIG. 4 is a cross-sectional view showing a connecting structure of the connecting part of the manufacturing machine connected to the machine tool in FIG. 2. FIG. 4 shows a cross section, along a horizontal plane, of the connecting structure.

Referring to FIGS. 1, 2, and 4, when additive manufacturing is to be performed on a workpiece, connecting part 21 of manufacturing machine 10 is connected to machine tool 70 (receiving part 76). Additive manufacturing head 31 is positioned in a machining area 200 of machine tool 70 through opening 73.

Connecting part 21 is fit in the recess formed by front part 76m and lateral parts 76n of receiving part 76. Front part 21m of connecting part 21 is brought into surface contact with front part 76m of receiving part 76, and lateral parts 21n of connecting part 21 are brought into contact with lateral parts 76n of receiving part 76. In this way, manufacturing machine 10 is positioned with respect to machine tool 70 and, at the same time, opening 73 of machine tool 70 is closed by connecting part 21.

In order to facilitate fitting of connecting part 21 into receiving part 76, connecting part 21 and receiving part 76 may each have a taper structure tapering in the direction in which additive manufacturing head 31 is advanced. The mechanism for positioning manufacturing machine 10 with respect to machine tool 70 is not limited to the fitting structure for fitting connecting part 21 in receiving part 76, and a positioning mechanism by means of a positioning pin may be used, for example.

In order to increase the sealability of machining area 200 during additive manufacturing, a seal member may be provided to at least one of respective contact surfaces of front part 21m and front part 76m and at least one of respective contact surfaces of lateral part 21n and lateral part 76n.

Manufacturing machine 10 and machine tool 70 are equipped with a lock mechanism for locking connection of connecting part 21 to machine tool 70 during additive manufacturing.

A more specific structure of the lock mechanism is described. In connecting part 21, a pin insert hole 26 is formed. Pin insert hole 26 is provided as a closed-ended hole having its opening in lateral part 21n. Machine tool 70 further includes a lock pin 78 and a lock pin drive mechanism (not shown). Lock pin 78 is provided to receiving part 76. The lock pin drive mechanism causes lock pin 78 to operate between the state in which lock pin 78 is contained in receiving part 76 and the state in which lock pin 78 protrudes from lateral part 76n.

Before connecting part 21 is connected to receiving part 76 of machine tool 70, lock pin 78 is contained in receiving part 76. When connecting part 21 is connected to receiving part 76 of machine tool 70, lock pin 78 is activated to protrude from lateral part 76n. At this time, lock pin 78 is inserted in pin insert hole 26 to thereby lock the state in which connecting part 21 is connected to machine tool 70.

The part of machine tool 70 to which manufacturing machine 10 is connected is not limited to receiving part 76 provided around opening 73, but may be located away from opening 73 (for example, a part of splashguard 71 located below closed door 72, for example). Moreover, the part of machine tool 70 to which manufacturing machine 10 is connected is not limited to splashguard 71, but may be the bed of machine tool 70, for example. The bed has high stiffness and therefore can more reliably maintain the positional accuracy of manufacturing machine 10 with respect to machine tool 70 during additive manufacturing. In these cases, manufacturing machine 10 is equipped with a closure member for closing opening 73 so as to ensure the sealability of machining area 200 during additive manufacturing.

Manufacturing machine 10 is equipped with an electrical connector 77p for transmission, from machine tool 70, of a control signal for additive manufacturing head 31 during additive manufacturing. Machine tool 70 is equipped with an electrical connector 77q to which electrical connector 77p is to be connected.

Electrical connector 77p is provided to connecting part 21. Electrical connector 77p is disposed on front part 21m of connecting part 21. Electrical connector 77q is provided to receiving part 76. Electrical connector 77q is disposed on front part 76m of receiving part 76. As connecting part 21 is connected to receiving part 76 of machine tool 70, electrical connector 77p is connected to electrical connector 77q.

The present embodiment is described above in connection with the structure using electrical connector 77p and electrical connector 77q that are automatically connected to each other to serve as an electrical interface between manufacturing machine 10 and machine tool 70. The electrical interface is not limited to this structure but may be a manually-operated cable connecting structure.

When additive manufacturing is to be performed on a workpiece, initially door 72 of machine tool 70 in which the workpiece to be processed is mounted on headstock 80 is opened to form opening 73. Manufacturing machine 10 is caused to approach machine tool 70 in the Y-axis direction. Additive manufacturing head 31 is caused to enter machining area 200 through opening 73. Connecting part 21 of manufacturing machine 10 is caused to fit in receiving part 76 of machine tool 70. Lock pin 78 is activated to be inserted in pin insert hole 26.

As seen from above, manufacturing machine 10 in the present embodiment performs additive manufacturing on a workpiece in machining area 200 of machine tool 70 by causing connecting part 21 to be connected to machine tool 70 and positioning additive manufacturing head 31 in machining area 200 of machine tool 70. Accordingly, the installation cost can be reduced as compared with the case where a complete manufacturing machine for additive manufacturing is installed separately from machine tool 70.

While the present embodiment is described above in connection with the case where machine tool 70 to which manufacturing machine 10 is to be connected is a lathe, the present invention is not limited to this. For example, manufacturing machine 10 may be connected to a machining center having the milling function, or manufacturing machine 10 may be connected to a multi-function manufacturing machine having both the turning function and the milling function, or manufacturing machine 10 may be connected to an AM/SM hybrid manufacturing machine capable of both additive manufacturing and subtractive manufacturing.

Moreover, manufacturing machine 10 may be connected to an additive manufacturing machine capable of additive manufacturing different in type from the additive manufacturing performed by manufacturing machine 10, rather than connected to the machine tool capable of subtractive manufacturing. In this case, for example, manufacturing machine 10 capable of additive manufacturing based on directed energy deposition is connected to an additive manufacturing machine capable of additive manufacturing based on powder bed fusion.

Manufacturing machine 10 having various devices for additive manufacturing is expensive. In view of this, a single manufacturing machine 10 can be selectively connected to any of a plurality of machine tools to enable different types of work processing with a small capital investment at a low cost.

Manufacturing machine 10 may have a height adjustment mechanism for changing the height of connecting part 21. The height adjustment mechanism is implemented for example by a hydraulic jack structure mounted on dolly 51, a feed mechanism/guide mechanism/servo motor or the like for sliding connecting part 21 in the height direction, for example. In this way, the height of connecting part 21 can be changed as appropriate for a machine tool to which manufacturing machine 10 is to be connected.

The above-described structure of manufacturing machine 10 in the first embodiment of the present invention is summarized. Manufacturing machine 10 in the present embodiment is a manufacturing machine capable of additive manufacturing. Manufacturing machine 10 includes: connecting part 21 configured to be connectable to machine tool 70 capable of subtractive manufacturing; and additive manufacturing head 31 configured to be positioned in machining area 200 of machine tool 70 and discharge a material, when connecting part 21 is connected to machine tool 70.

Manufacturing machine 10 in the first embodiment of the present invention configured in this manner can implement an additive manufacturing machine that can be installed at a low cost.

Second Embodiment

In connection with the present embodiment, a description is given of an example of the processing method for successively performing additive manufacturing and subtractive manufacturing on a workpiece by means of manufacturing machine 10 in the first embodiment.

Figure 5:
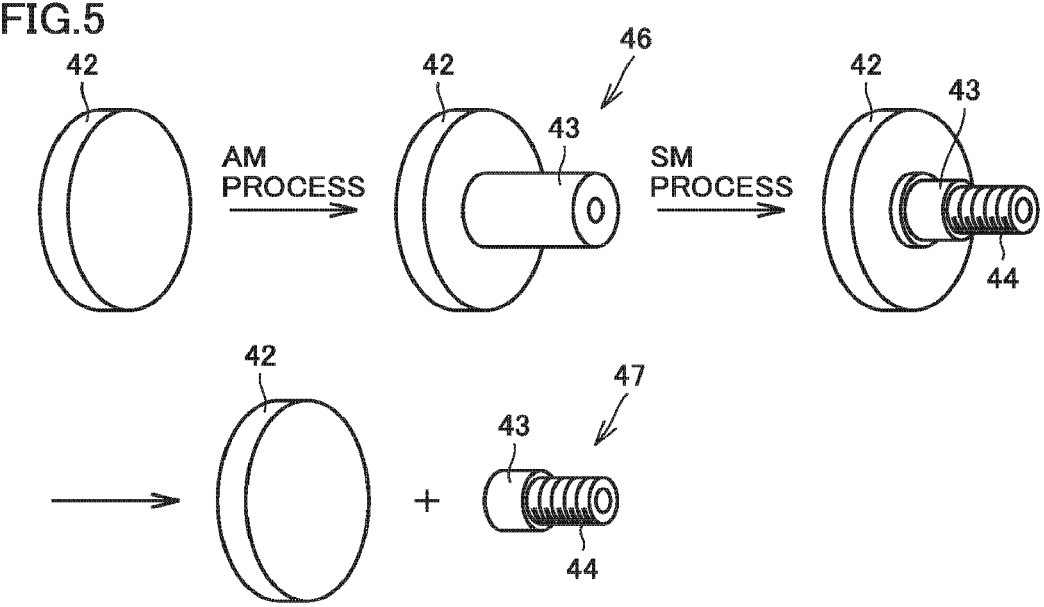
FIG. 5 is a diagram showing a shape of a workpiece changed through additive manufacturing and subtractive manufacturing.

FIG. 5 is a diagram showing a shape of a workpiece changed through additive manufacturing and subtractive manufacturing. Referring to FIG. 5, a base material 42 is prepared first. Base material 42 has a disc shape. Next, additive manufacturing is performed to form a cladding portion 43 on an end face of base material 42. Cladding portion 43 has a cylindrical shape. Next, subtractive manufacturing is performed to form a threaded portion 44 on the outer peripheral surface of cladding portion 43. Finally, base material 42 is separated from cladding portion 43 to produce a final product 47 including threaded portion 44 formed thereon.

FIGS. 6 to 11 are each a diagram schematically showing a step of a processing method for the workpiece in FIG. 5. Machine tool 70 shown in these drawings includes a headstock 82 instead of tailstock 89 in FIG. 2. Headstock 80 and headstock 82 are disposed to face each other in the Z-axis direction. Headstock 82 includes a spindle 83 for rotating a workpiece. Spindle 83 is configured to be rotatable about a central axis extending in parallel with the Z axis. Spindle 83 is equipped with a chuck mechanism for detachably holding a workpiece.

Figure 6:
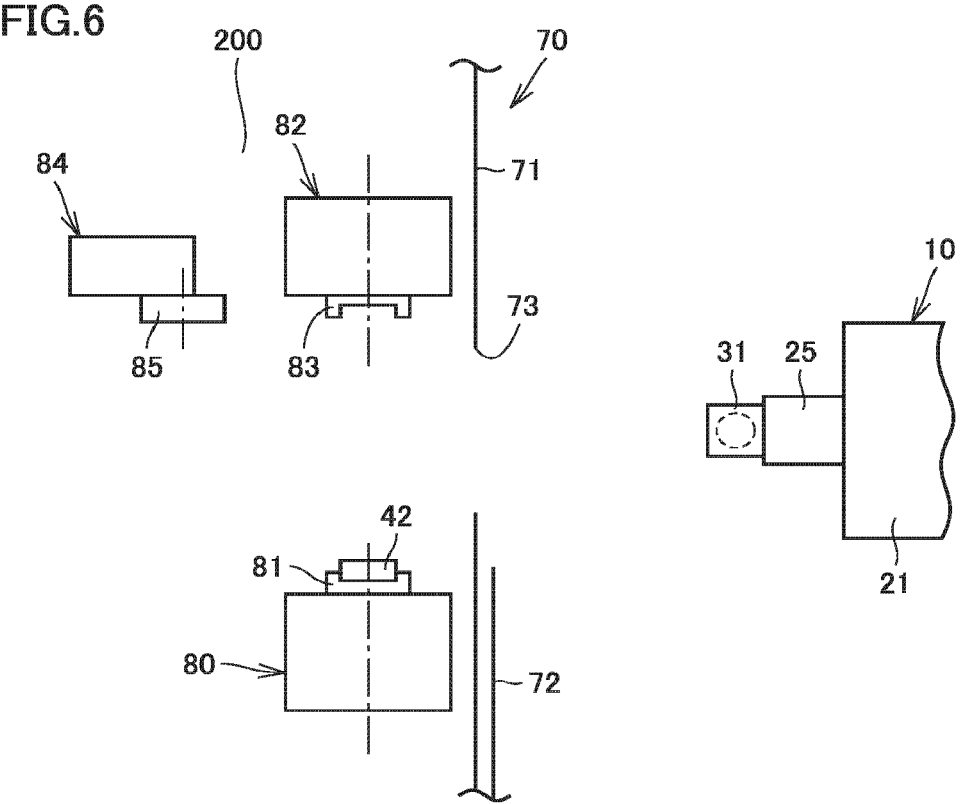
FIG. 6 is a diagram schematically showing a first step of a processing method for the workpiece in FIG. 5.

Referring to FIG. 6, in machining area 200 of machine tool 70, a base material 42 is mounted on headstock 80. Door 72 of machine tool 70 is opened to form opening 73.

Figure 7:
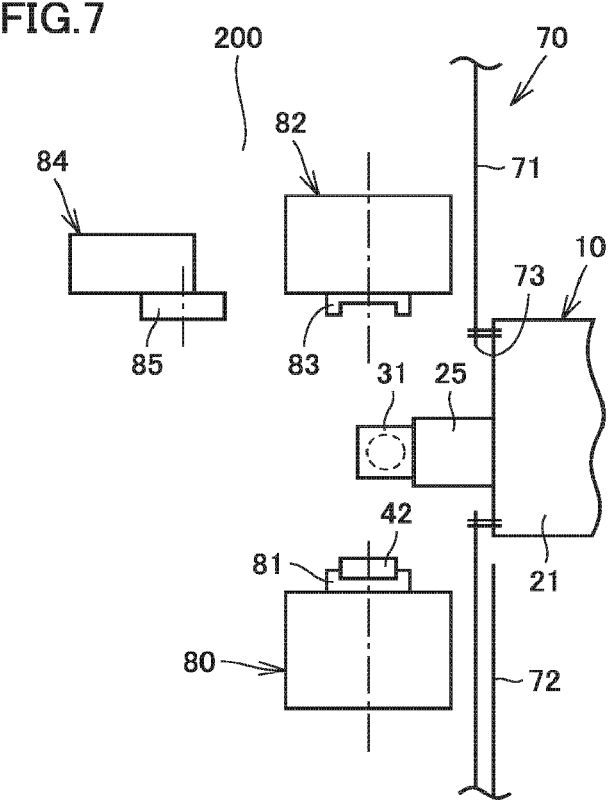
FIG. 7 is a diagram schematically showing a second step of the processing method for the workpiece in FIG. 5.

Referring to FIG. 7, manufacturing machine 10 is caused to approach machine tool 70. Additive manufacturing head 31 is caused to enter machining area 200 through opening 73. Connecting part 21 of manufacturing machine 10 is connected to machine tool 70.

Figure 8:
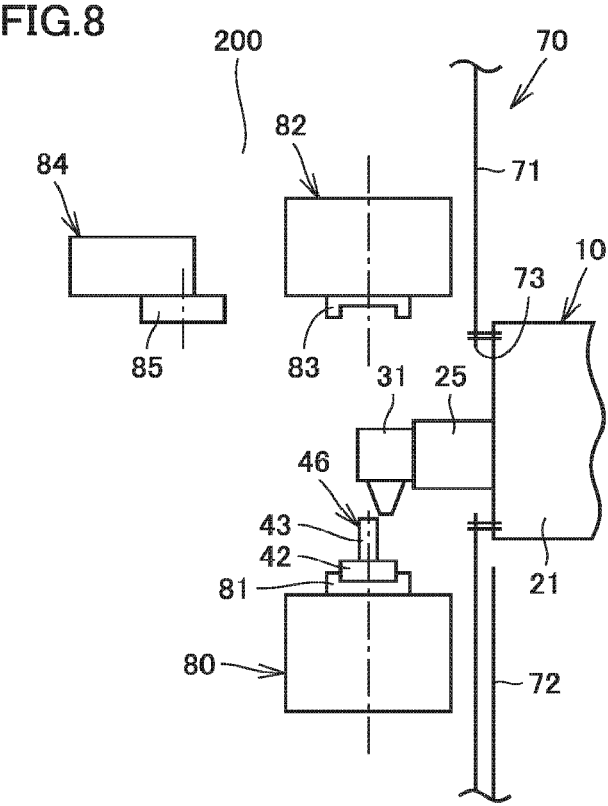
FIG. 8 is a diagram schematically showing a third step of the processing method for the workpiece in FIG. 5.

Referring to FIG. 8, operation panel 88 (see FIG. 2) is then operated to perform additive manufacturing by means of additive manufacturing head 31. Specifically, additive manufacturing head 31 is caused to approach base material 42 mounted on headstock 80. While a laser beam is applied and material powder is supplied to base material 42, additive manufacturing head 31 is caused to scan over the end face of base material 42 to form a cladding portion 43. Accordingly, an intermediate product 46 is produced.

After the additive manufacturing is completed, manufacturing machine 10 is disconnected from machine tool 70 and manufacturing machine 10 is withdrawn from machine tool 70. Door 72 of machine tool 70 is closed.

Figure 9:
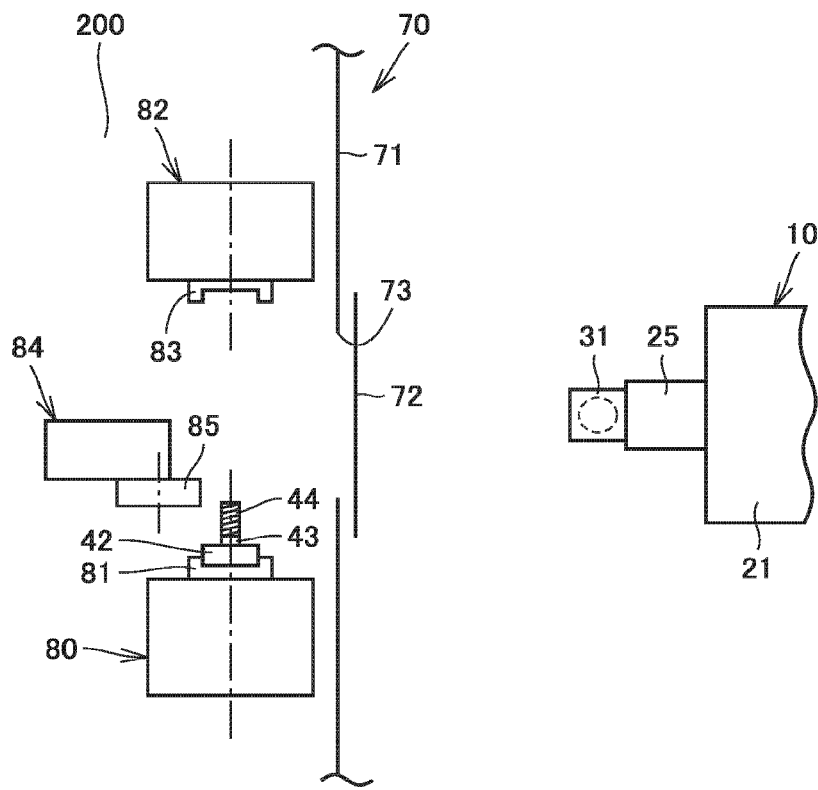
FIG. 9 is a diagram schematically showing a fourth step of the processing method for the workpiece in FIG. 5.

Referring to FIG. 9, operation panel 88 (see FIG. 2) is then operated to cause subtractive manufacturing to be performed by means of a tool attached to tool rest 84. Specifically, with a tool attached to tool rest 84, a threaded portion 44 is formed in cladding portion 43.

Figure 10:
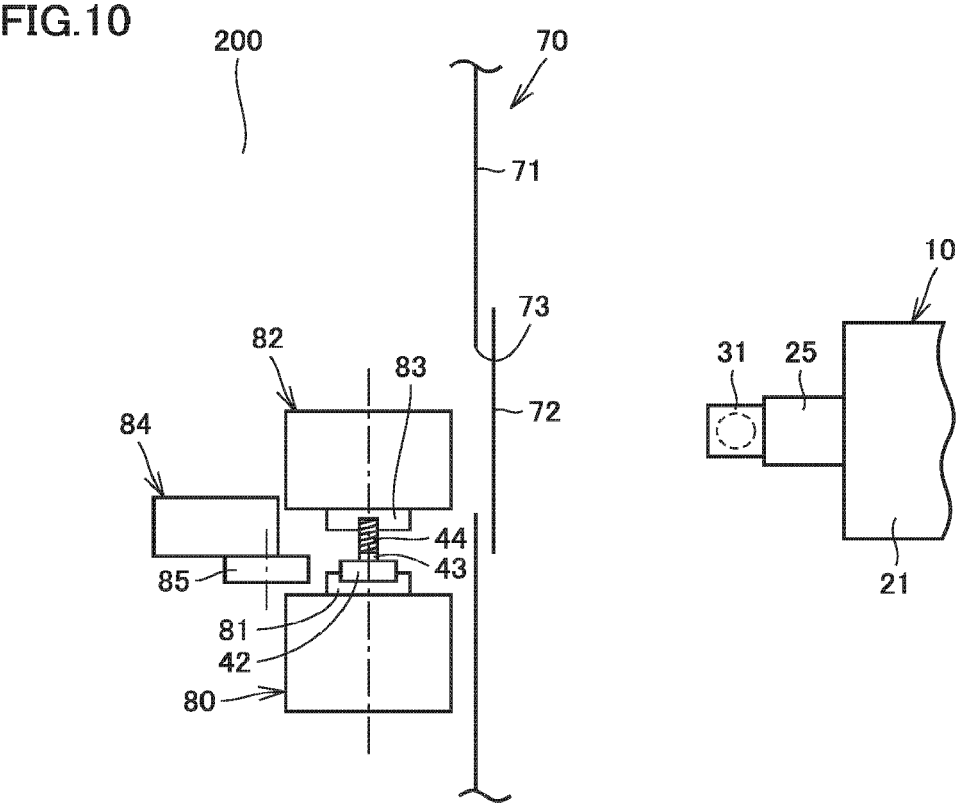
FIG. 10 is a diagram schematically showing a fifth step of the processing method for the workpiece in FIG. 5.

Referring to FIG. 10, headstock 80 and headstock 82 are caused to approach each other while respective rotations of spindle 81 and spindle 83 are synchronized with each other. An end of cladding portion 43 of intermediate product 46 is held by chucking on spindle 83. With the opposite ends of intermediate product 46 held by headstock 80 and headstock 82, subtractive manufacturing (cut-off machining) is performed for separating base material 42 from cladding portion 43. Accordingly, base material 42 is left on headstock 80 and a final product 47 is left on headstock 82.

Referring to FIG. 11, door 72 of machine tool 70 is opened and final product 47 is removed from headstock 82. Subsequently, the process can return to the step shown in FIG. 6 to successively manufacture final products 47 on which threaded portion 44 is formed.

Manufacturing machine 10 and the processing method in the second embodiment of the present invention configured in this manner can produce the effects described above in connection with the first embodiment as well.

A manufacturing machine according to an aspect of the present invention is a manufacturing machine capable of additive manufacturing. The manufacturing machine includes: a connecting part configured to be connectable to a machine tool capable of subtractive manufacturing; and an additive manufacturing head configured to be positioned in a machining area of the machine tool and discharge a material, when the connecting part is connected to the machine tool.

The manufacturing machine configured in this manner has the connecting part connected to the machine tool and the additive manufacturing head positioned in the machining area of the machine tool to thereby perform additive manufacturing on a workpiece in the machining area of the machine tool. Thus, the manufacturing machine for additive manufacturing that can be installed at a low cost can be implemented.

Preferably, the additive manufacturing head enters the machining area through an opening of the machine tool formed by opening a door of the machine tool.

Regarding the manufacturing machine configured in this manner, the additive manufacturing head can be positioned in the machining area of the machine tool without significant change of the design of the machine tool.

Preferably, the manufacturing machine further includes an electrical connector configured to be connected to the machine tool for transmitting, from the machine tool, a control signal for the additive manufacturing head, when the connecting part is connected to the machine tool.

Regarding the manufacturing machine configured in this manner, the workability in connecting the electrical connector to the machine tool can be improved.

Preferably, the manufacturing machine further includes a head drive mechanism configured to move the additive manufacturing head three-dimensionally.

Regarding the manufacturing machine configured in this manner, the additive manufacturing head can be moved freely with respect to a workpiece in the machining area of the machine tool.

Preferably, the manufacturing machine further includes a height adjustment mechanism configured to change a height of the connecting part.

Regarding the manufacturing machine configured in this manner, the height of the connecting part can be changed as appropriate for a machine tool to which the manufacturing machine is to be connected.

Preferably, the additive manufacturing head is configured to perform additive manufacturing by discharging material powder and emitting a laser beam to a workpiece. The manufacturing machine further includes: a dolly on which the connecting part and the additive manufacturing head are mounted; a material powder feeder mounted on the dolly and configured to feed material powder to the additive manufacturing head; and a laser oscillator mounted on the dolly and configured to generate a laser beam to be emitted to a workpiece.

Regarding the manufacturing machine configured in this manner, the additive manufacturing unit into which the material powder feeder and the laser oscillator are integrated can be moved by means of the dolly.

Preferably, the additive manufacturing head is configured to discharge an inert gas to the workpiece when discharging the material powder and emitting the laser beam to the workpiece. The manufacturing machine further includes: an inert gas feeder serving as a source of an inert gas to be discharged to the workpiece; and an environmental measurement device configured to measure an environment in the machining area of the machine tool.

Regarding the manufacturing machine configured in this manner, the manufacturing machine can be handled as an additive manufacturing unit in which the inert gas feeder and the environmental measurement device are further integrated.

A manufacturing machine according to another aspect of the present invention is a manufacturing machine capable of a first additive manufacturing. The manufacturing machine includes: a connecting part configured to be connectable to an additive manufacturing machine capable of a second additive manufacturing different in type from the first additive manufacturing; an additive manufacturing head configured to be positioned in a machining area of the additive manufacturing machine and perform the first additive manufacturing by discharging material powder and emitting a laser beam to a workpiece, when the connecting part is connected to the additive manufacturing machine; a material powder feeder configured to feed material powder to the additive manufacturing head; and a laser oscillator configured to generate a laser beam to be emitted to a workpiece.

Regarding the manufacturing machine configured in this manner, the connecting part is connected to the additive manufacturing machine and the additive manufacturing head is positioned in the machining area of the additive manufacturing machine to thereby perform, in the machining area of the additive manufacturing machine, the first additive manufacturing different in type from the second additive manufacturing performed in the additive manufacturing machine. Accordingly, additive manufacturing machines that can be installed at a low cost can be implemented.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is applied to manufacturing machines capable of additive manufacturing.

REFERENCE SIGNS LIST

10 manufacturing machine; 21 connecting part; 21*m*, 76*m* front part; 21*n*, 76*n* lateral part; 23 front cover; 25 head-supporting cylinder; 26 pin insert hole; 31 additive manufacturing head; 32 main body; 33 laser beam emission part; 34 optical element; 35, 73 opening; 40 workpiece; 42 base material; 43 cladding portion; 44 threaded portion; 46 intermediate product; 47 final product; 51 dolly; 52 wheel; 61 material powder feeder; 62 laser oscillator; 63 tubular member; 70 machine tool; 71 splashguard; 72 door; 76 receiving part; 77*p*, 77*q* electrical connector; 78 lock pin; 80, 82 headstock; 81, 83 spindle; 84 tool rest; 85 swivel unit; 88 operation panel; 89 tailstock; 200 machining area; 311 laser beam; 312 material powder; 313 gas; 314 melt spot; 315 cladding material; 316 cladding layer

The invention claimed is:

1. A manufacturing machine capable of additive manufacturing, the manufacturing machine comprising:
    a connecting part configured to be connectable to a machine tool selected from a plurality of machine tools each being capable of subtractive manufacturing;
    an additive manufacturing head configured to be positioned in a machining area of the machine tool and discharge a material, when the connecting part is connected to the machine tool, the additive manufacturing head being configured to perform additive manufacturing by discharging material powder and emitting a laser beam to a workpiece;
    an electrical connector configured to be connected to the machine tool for transmitting, from the machine tool, a control signal for the additive manufacturing head, when the connecting part is connected to the machine tool;
    a dolly on which the connecting part and the additive manufacturing head are mounted;
    a material powder feeder mounted on the dolly and configured to feed material powder to the additive manufacturing head; and
    a laser oscillator mounted on the dolly and configured to generate a laser beam to be emitted to a workpiece.

2. The manufacturing machine according to claim 1, wherein
    the additive manufacturing head enters the machining area through an opening of the machine tool formed by opening a door of the machine tool.

3. The manufacturing machine according to claim 1, further comprising a head drive mechanism configured to move the additive manufacturing head three-dimensionally.

4. The manufacturing machine according to claim 1, further comprising a height adjustment mechanism configured to change a height of the connecting part.

5. The manufacturing machine according to claim 1, wherein
    the additive manufacturing head is configured to discharge an inert gas to the workpiece when discharging the material powder and emitting the laser beam to the workpiece, and
    the manufacturing machine further comprises:
        an inert gas feeder serving as a source of an inert gas to be discharged to the workpiece; and
        an environmental measurement device configured to measure an environment in the machining area of the machine tool.

6. The manufacturing machine according to claim 1, wherein
    the machine tool has a cover body defining the machining area and presenting an appearance of the machine tool, and
    the connecting part is configured to be connectable to the cover body.

7. The manufacturing machine according to claim 1, wherein the connecting part presents a shape of a rectangular parallelepiped and includes
- a front part having a strip-shaped edge and an opening inside the strip-shaped edge, and
- a front cover configured to close the opening of the front part,
- wherein the electrical connector is provided on the strip-shaped edge of the front part of the connecting part,
- wherein the additive manufacturing head is attached to a leading end of a head-supporting cylinder, the head-supporting cylinder extending from the front cover in a direction parallel to an axis of the head-supporting cylinder, and
- wherein the front cover is a telescopic cover that allows the head-supporting cylinder to move in a vertical direction and in a direction perpendicular to the vertical direction and to the axis of the head-supporting cylinder.

8. The manufacturing machine according to claim 7, wherein the connecting part includes lateral parts extending in a direction crossing the front part, and a pin insert hole formed in one of the lateral part, the pin insert hole receiving a lock pin of the machine tool when the connecting part is connected to the machine tool.

* * * * *